March 5, 1968  B. CARLIN  3,371,660
EQUIPMENT FOR USE IN ULTRASONIC EYE EXAMINATION
Filed Sept. 1, 1966  2 Sheets-Sheet 1
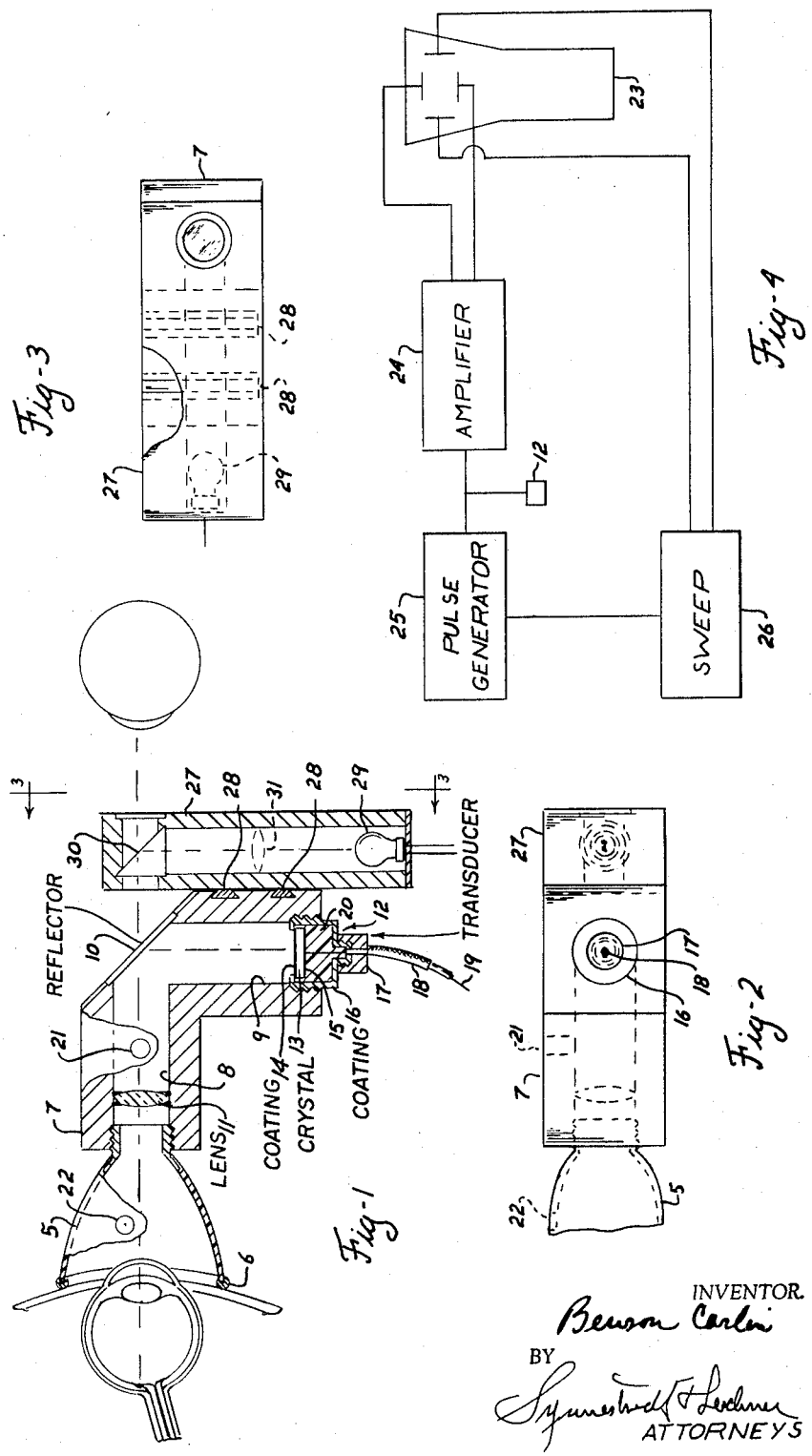

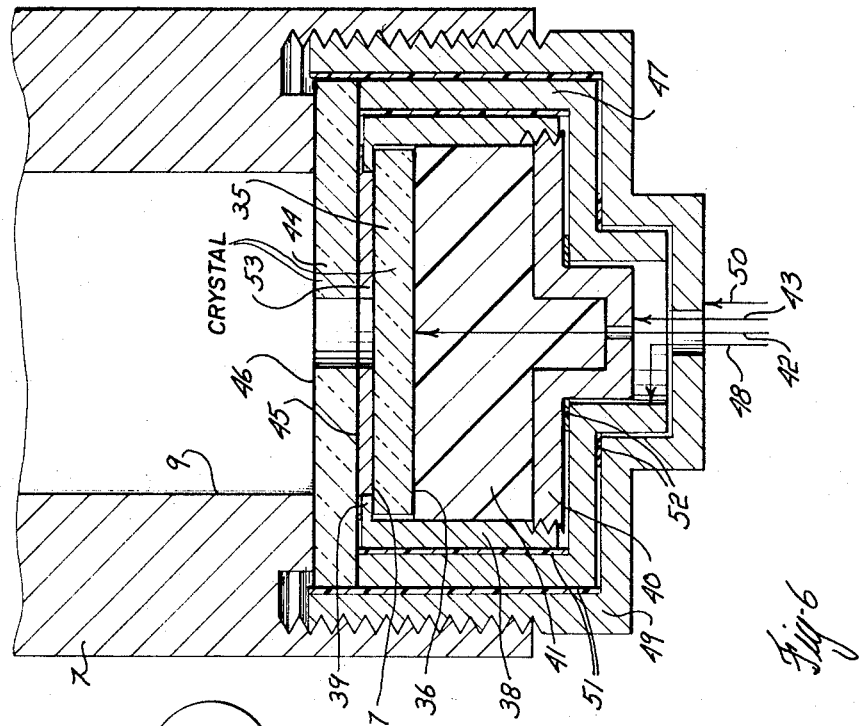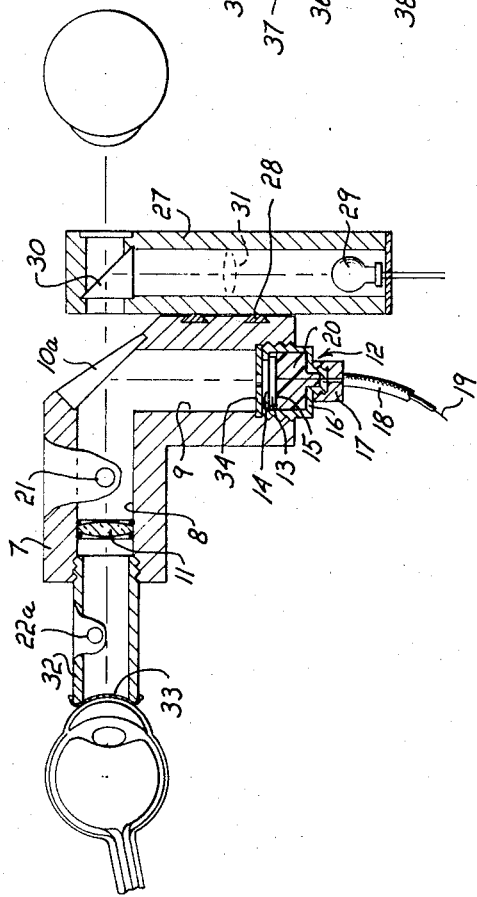

United States Patent Office 3,371,660
Patented Mar. 5, 1968

3,371,660
EQUIPMENT FOR USE IN ULTRASONIC EYE EXAMINATION
Benson Carlin, Princeton, N.J., assignor to Air-Shields, Inc., Hatboro, Pa., a corporation of Delaware
Continuation-in-part of application Ser. No. 447,419, Apr. 12, 1965. This application Sept. 1, 1966, Ser. No. 576,723
14 Claims. (Cl. 128—2)

ABSTRACT OF THE DISCLOSURE

Equipment for use in ultrasonic eye examination including a device having angularly aranged bores, with a transparent ultrasonic wave reflector at the junction of the bores, providing for concurrent visual and ultrasonic eye examination.

---

The present application is a continuation-in-part of my prior application Ser. No. 447,419, filed Apr. 12, 1965 now abandoned.

This invention relates to equipment for use in eye examination and is particularly concerned with equipment adapted to the examination of interior parts of the eye.

It has been known to employ ultrasonics for the general purpose referred to above, and in prior work of this kind an ultrasonic wave is propagated by a transducer in some medium, such as water, and is transmitted through the water to the surface of the eye and thence into the eye, to be reflected from various parts of the interior structure of the eye, for instance from the fovea centralis. The echo wave reflected in this manner is then returned to the transducer and the signal from the transducer is used for the purpose of projecting information onto the screen of an oscilloscope. In this manner it is possible to identify malformations within the eye and to make various other diagnoses involving dimensional features of the eye structure.

The present invention is concerned with a system or equipment adapted to the foregoing purposes but further having certain additional capabilities, including especially the capability of making visual observation into the eye concurrently with the ultrasonic examination.

Preferably, according to the invention, provision is made for visual observation of the eye along the same axis on which the ultrasonic wave penetrates the eye. The invention thus provides for adjustment or movement of the equipment in accordance with what the operator observes, thereby enabling the operator to direct the ultrasonic wave at any observed point within the eye structure.

Other objects of the invention include provision for retaining all or at least most of the water or other ultrasonic transmissive liquid contained in the instrument when the instrument is removed from an eye after examination thereof, thereby eliminating or minimizing the spilling of the liquid.

The invention also contemplates provision of an ultrasonic eye examination instrument having improved ultrasonic transducer means providing for propagation of a wave or beam of relatively small diameter, to thereby facilitate securing an echo wave from an area of correspondingly small diameter within the eye. In this way it is possible to diagnose dimensional features of more localized spots or surfaces within the eye.

Still further, it is an object of the invention to provide an ultrasonic transducer arrangement which not only propagates an ultrasonic wave or beam of small diameter, but which is capable of receiving or responding to echo waves generated by the propagated wave, even where the echo does not return to the transducer mechanism at exactly the same spot from which the propagated wave originates. In this way the echo wave will produce the desired signal in the transducer mechanism even where the echo wave returns to the transducer at an angle to the axis of the propagated wave. This transducer arrangement is usable for many purposes, but is especially suitable for use in eye examination instruments of the kind herein disclosed.

How the foregoing and other objects and advantages are attained will appear more fully from the following description referring to the accompanying drawing illustrating preferred embodiments of the equipment and in which:

FIGURE 1 is a horizontal plan sectional view of equipment constructed according to the present invention and shown in operative relationship to an eye being examined and also to an eye of the operator;

FIGURE 2 is an elevational view of the equipment shown in FIGURE 1 taken from the bottom of FIGURE 1;

FIGURE 3 is another elevational view, taken as indicated by the line 3—3 on FIGURE 1;

FIGURE 4 is a schematic or block diagram of a typical ultrasonic propagating and receiving equipment;

FIGURE 5 is a view similar to FIGURE 1 but illustrating an instrument incorporating several modifications as compared with the instrument of FIGURE 1; and FIGURE 6 is a considerably enlarged sectional view of another modification of transducer means particularly useful in connection with an instrument of the kind herein disclosed.

In FIGURE 1 there is shown toward the left a somewhat diagrammatic view of an eye to be examined, it being here assumed that this eye is a human eye. The equipment or instrument of the invention preferably includes a device indicated at 5, which may conveniently be in the form of an eyecup, having a lip 6 adapted to engage and provide a liquid-tight seal against the eye socket of the patient, surrounding the eye to be examined.

In the embodiment illustrated, the instrument further comprises a housing or body structure 7 having a pair of bores 8 and 9 therein with their axes arranged at angles to each other in positions to intersect. Conveniently the axes of the two bores 8 and 9 are arranged at right angles to each other. At the point of intersection a reflector 10 is provided, this reflector being positioned so as to reflect waves from one bore to the other, the reflector preferably being so angled as to reflect waves from the axis of one bore to the axis of the other bore. In the illustrative embodiment shown, since the two bores are at right angles to each other, the reflector 10 would be positioned at angles of 45° to the axis of each of the two bores.

In the preferred embodiment illustrated, a lens 11 is provided in the bore 8 adjacent the eyecup 5, this lens serving various purposes, as described hereinafter.

A transducer device generally indicated at 12 is disposed in the bore 9 toward the outer end thereof. This device may be of known type for propagating ultrasonic waves and for receiving echo waves. The device is shown only somewhat diagrammatically here, but it may be noted that in a typical case it would include a crystal 13 having silver plating on both sides as indicated at 14 and 15. The crystal is mounted toward the open of the externally threaded cup 16 having a flange overlying the edge portion of the plating 14 and constituting one of the electrical connections to the crystal. The cap 17 may serve to electrically interconnect the sheath or shield 18 surrounding the conductor 19 with the cup 16, the shield 18 being insulated from the cap 12. The conductor 19 extends through the insulating material 20 within the cup 16 for connection with the silver coat 15 at the rear side of the crystal 13.

In the preferred embodiment, the volume within the bores 8 and 9 between the lens 11 and the front silver coating 14 of the transducer is filled with a liquid effective for transmission of ultrasonic waves, preferably water. For this purpose, one or more filling holes 21 may be provided preferably on the upper side of the housing 7 of the instrument.

In addition it is contemplated that the eyecup 5 shall be filled with an ultrasonic transmissive liquid, advantageously water, for which purpose one or more apertures 22 may be provided desirably on the upper side of the eyecup.

From the standpoint of the fundamental operation of the instrument, it is not necessary to divide the liquid in the eyecup 5 from the liquid in the bore 8, in view of which the lens 11 may be omitted. However, the use of the lens or a similar divider is of advantage, especially where it is located relatively close to the eye position, because this avoids discharge or spilling of any of the liquid except for the small amount in the eyecup between individual uses of the instrument. Preferably separate filling holes 21 and 22 are provided for the main housing of the instrument and for the eyecup. In this way the main housing of the instrument may be charged with a liquid which may be retained therein over a long period of use.

In the system as thus described, during operation, the ultrasonic wave propagated from the surface coating 14 of the transducer is reflected by the reflector 10 along the axis of the bore 8. This wave may be focused or concentrated to a desired extent by the lens 11, which is advantageously formed of a solid transparent resin type material. Polymethylmethacrylate is an example of an effective material for this purpose. This and certain other resin materials are desirable because of the fact that the ultrasonic transmissive characteristics thereof are similar to those of water, thereby minimizing reflections or echos originating at the interfaces between the lens itself and the bodies of water on the two sides thereof.

The ultrasonic wave or beam transmitted through the lens and into the eye will cause reflections or echos from various of the membranes and interfaces between different parts of the eye, such as the cornea, the lens and the fovea centralis. These echos will be returned along the axis of the bore 8 and will also be reflected by the reflector 10 back to the transducer, thereby initiating signals which may be reproduced in any desired manner, for instance in the known type of equipment illustrated in FIGURE 4. Here there is diagrammatically shown an oscilloscope at 23 connected in a circuit with an amplifier 24, pulse generator 25 and sweep controlling circuit 26, the transducer 12 being connected into this system between the pulse generator and amplifier in a typical case. The arrangement of circuitry of this kind need not be considered herein since it is well known and forms no part of the present invention per se.

In connection with the dimensioning of various parts of the instrument shown in FIGURE 1, it should be kept in mind that the ultrasonic path from the transducer 12 to the cornea of the eye being examined is preferably greater than the distance desired to be measured, for instance the distance from the cornea through the eye to the fovea centralis. Thus, with the human eye, since the eye is roughly one inch in diameter, the ultrasonic path to the cornea is preferably in excess of one inch, advantageously several inches, as is indicated in the drawing. This will avoid confusion between multiple echo waves reproduced on the oscilloscope as a result of reflection from the cornea on the one hand and from the fovea centralis (for example) on the other hand.

Attention is now called to the fact that in accordance with the invention the reflector 10 is composed of a transparent element, for instance a flat piece of optical quality glass, and this element is optically exposed exteriorly of the device. In view of this, and with a transparent medium within the eyecup 5 and within the bore 8, and also with a transparent lens 11, provision is made for visual observation of the eye through the reflector 10 and along the axis of the bore 8.

Where concentration of the ultrasonic beam is not needed or desired, the element 11 may take the form of a flat parallel sided piece, made, for example, of polymethylmethacrylate. In this event, the element 11 is in effect a partition in the device spaced from the eye position to shut off a chamber adapted to be associated with the eye.

To facilitate visual observation, the equipment further includes a suitable device for projecting a beam of light into the eye also along the axis of the bore 8. This device may comprise any of the well known forms of ophthalmoscope, FIGURE 1 including a somewhat diagrammatic illustration of a device of this sort. Although a separately handled device of this sort (having a reticle to assist proper positioning) may be used, it is of advantage to connect the ophthalmoscope to the remainder of the instrument. For this purpose the casing 27 of the ophthalmoscope shown is provided with dovetail keys 28, adapted to cooperate with complementary dovetail grooves in a portion of the wall of bore 9 of the remainder of the instrument, this type of mounting providing for separation of the device 27 if desired and yet for establishment of a fixed relationship between the casing 27 and the housing 7. A source of light such as a small bulb is indicated at 29 toward the bottom of FIGURE 1 and an optical prism 30 is arranged to reflect the light from the source 29 into the axis of the bore 8 through the reflector 10. The eye of an operator or observer is indicated toward the right of FIGURE 1 in position to make visual observation into the eye being examined through the prism 30, through the reflector 10 and along the axis of bore 8 into the eye being examined. A lens system diagrammatically indicated at 31 may be incorporated in the device 27 between the light source 29 and the prism 30.

In addition to the use of the lens 11 for sonic focus, the lens 11 may be used for optic focus in the light path from the source 29 into the eye and back along the line of observation to the eye of the person using the instrument.

With the equipment as described above it is possible to visually observe the point in the eye to which the ultrasonic wave is directed, and in this way the ultrasonic wave may be moved from one portion of the eye to another in accordance with the desire of the observer. This greatly facilitates diagnoses and significantly widens the field of usefulness of ultrasonic eye examination.

Although the employment of water in the eyecup and also within the bores 8 and 9 is preferred for most purposes, it should be noted that the bores 8 and 9 may also advantageously be infilled with certain other materials suitable for ultrasonic transmission. However, because it is contemplated to make visual observation along the axis of bore 8, the ultrasonic medium within that bore should be transparent, although transparency is not a requirement of the medium within the bore 9. An example of a solid which may be used to infill the bores 8 and 9 is polymethylmethacrylate, and similar resins having ultrasonic transmissive characteristics similar to those of water or other liquids to be employed in the eyecup 5. Although from the standpoint of transmission of the ultrasonic wave, even the eyecup could be filled with a material such as polymethylmethacrylate, nevertheless it is preferred to employ a liquid and preferably a liquid such as water which is not harmful to the eye within the cup 5, because of the fact that the liquid will automatically provide the intimacy of contact betwen the transmission medium and the surface of the eye which is required for transmission of the ultrasonic wave into the eye and also for return of the echo from the eye into the medium.

In the case of infilling the bores 8 and 9 with a resin such as polymethylmethacrylate, the mass of resin may in effect also include the volume of the lens 11 indicated in FIGURE 1, in which case the end surface of this body of resin may be ground to whatever curvature is desired for concentration of the ultrasonic wave. It will be understood, of course, that the curvature either of a separate lens such as shown in FIGURE 1, or of a body of resin completely infilling the bores 8 and 9, should not be such as to impair the optical observation along the axis of bore 8.

Although in the instrument illustrated the housing 7 comprises two interconnected cylindrical parts, neither the interior or exterior shape need necessarily be exactly as illustrated, so long as the mass or body of the ultrasonic medium within the device provides the intersecting wave paths, with the transparent reflector at the junction, this arrangement being important in accordance with the invention in order to provide for location of the transducer in a position offset from the axis or path entering the eye. In this way the optical path to the eye will not be obstructed.

While, as above indicated, there are certain advantages in employing water in the instrument, especially at the zone of entry of the ultrasonic wave into the eye, nevertheless it is also practical to employ an arrangement in which the portion of the instrument brought into registry with the eye is closed by a thin flexible membrane adapted to conform to the contour or curvature of the eye. This also has certain advantages which are explained herebelow with reference to FIGURE 5 illustrating a modified instrument incorporating such a membrane.

In FIGURE 5 various parts of the instrument which are the same as or closely similar to those of FIGURE 1 have been identified by the same reference numerals. It will be seen from FIGURE 5 that instead of employing an eyecup such as indicated at 5 in FIGURE 1, a tubular member 32 is threaded into the bore 8 and projects therefrom. The outer end of this tubular member is closed by means of a flexible membrane 33 preferably formed of transparent material, so as not to interfere with the desired visual observation during the ultrasonic examination. Preferably also the membrane 33 is formed of a material having ultrasonic transmissive characteristics similar to those of water or other liquid used within the instrument. For example this membrane is desirably formed of polyethylene terephthalate.

The chamber within the tubular member 32 may be provided with a filling hole such as indicated at 22a and this may be plugged if desired to avoid spilling.

By employing an arrangement such as just described, the membrane may be brought into contact with the surface of the eye being examined and loss or spilling of water or other liquid will not occur in the handling and use of the instrument.

In the arrangement of FIGURE 5, the reflector 10a which in general performs the same functions as the reflector indicated at 10 in FIGURE 1 is formed as a prism, instead of as a flat plate. The prism desirably comprises glass of optical grade and the surface of the prism exposed to the interior of the instrument is positioned at the required angle to effect reflection of the propagated wave from the axis of the bore 9 to the axis of the bore 8 and also to effect reflection of the echo wave from the axis of the bore 8 to the axis of the bore 9. The outer surface of the prism 10a lies in a plane at an angle to the plane of the inner surface, which angle is selected to correct for the refraction occurring along the visual observation path from the eye of the user of the instrument to the eye being examined. With an instrument of the kind illustrated, having a glass-water interface at the reflecting surface and having a reflecting surface at 45° to the axis of visual observation, the angle required for refraction correction is in the neighborhood of 12°.

In the embodiment of FIGURE 5, still another modification is shown. While the transducer 12 is the same as illustrated in FIGURE 1, an apertured diaphragm or shutter 34 is interposed between the transducer and the bore 9. This shutter is formed of a material having substantial opacity with reference to ultrasonic waves, so that the size of the wave or beam propagated is reduced to that of the aperture in the shuter. In this way provision is made for the propagation of a small diameter beam, for instance of the order of 2 millimeters, without requiring use of a crystal of correspondingly small size. The grinding of such crystals in small sizes is not practical. It may be noted in connection with the employment of the shutter that the concentration of the wave or beam by employment of a lens such as illustrated at 11 may not be required, although if used it may serve to still further concentrate or reduce the size of the beam ultimately reaching the surface in the eye from which an echo is desired for diagnostic purposes.

In the illustration of FIGURE 6, there is shown on an enlarged scale one portion of the structure 7 of the device, i.e. the portion having the bore 9 therein; and here there is illustrated a modified transducer mechanism constructed as follows:

Two piezo-electric crystals are here employed, instead of only a single crystal as in FIGURES 1 and 5. The crystal 35 is a wave propagating crystal having silver plating on both sides indicated at 36 and 37, the crystal 35 being mounted in a metal sleeve 38 having an inturned flange 39 adapted to overlie and make contact with the silver coating 37. The sleeve 38 is closed by the member 40 and may be infilled with a plastic material such as indicated at 41 through which the conductor 42 extends for connection with the silver coating 36. The electrical connection 43 may be attached to the member 40 and thus establish connection with the coating 37 through the sleeve 38.

The other crystal is indicated at 44, and this comprises a centrally apertured element and having silver plating at the two surfaces indicated at 45 and 46.

Another sleeve 47 is arranged to contact the coating 45, and a conductor 48 connected with this sleeve serves as the electrical connection to the coating 45. The entire assembly of parts may be mounted in operative position with respect to the bore 9 of the structure 7 by means of the threaded sleeve 49. When the parts are assembled as shown the silver coating 46 contacts the metal of the structure 7 and is thus electrically connected with the threaded sleeve 49, so that an electrical connection indicated at 50 made to the sleeve 49 will serve as the connection for the coating 46.

Insulating spacing sleeves 51 and insulating washers 52 are provided between the metal sleeves 38, 47 and 49 to electrically isolate these parts from each other.

A sonically opaque apertured diaphragm or shutter 53 is interposed between the crystals 35 and 44, and all of the parts are retained in assembled relation by screwing the outer sleeve 49 into its socket at the end of the bore 9.

With the transducer arranged in accordance with FIGURE 6, the crystal 35 advantageously is used for the propagation of an ultrasonic beam, which proceeds from the silver coating 37 through the aligned apertures in the shutter 53 and the crystal 44. The ultrasonic echo is advantageously received by the crystal 44 which has relatively large receiving area, as compared with the size of the aperture and which may therefore receive echo waves returning to the transducers at various different angles with respect to the axis of the beam propagated by the crystal 35.

Thus, the arrangement of FIGURE 6 not only has the advantages pointed out above in connection with the transducer of FIGURE 5, but in addition does not require positioning of the echo beam on exactly the same axis as the propagated beam.

I claim:

1. Equipment for use in eye examination comprising a hollow device having two interconnected bores therein at right angles to each other and adapted to contain a transparent liquid, one bore having an opening adapted to be brought into registry with an eye along the axis of said one bores, an ultrasonic transducer exposed to the liquid in the other bore in position to propagate a wave along the axis of said other bore, and a reflector for the propagated wave having a reflecting surface exposed to the liquid in the bores and positioned at 45° to the axes of the bores to reflect propagated and echo waves between the bores, the reflector comprising a transparent element optically exposed to the exterior of the device along the axis of said one bore to provide for visual observation of the eye along that axis.

2. Equipment according to claim 1 and further including a source of light mounted in fixed relation to the bores of the device and providing for projection of a beam of light along the axis of said one bore through the liquid therein and into the eye.

3. Equipment for use in eye examination comprising a hollow device adapted to contain a transparent liquid and having an opening adapted to be brought into registry with an eye along a first axis, an ultrasonic transducer exposed to the liquid in the device in position to propagate a wave along a second axis at an angle to the first, and a reflector for the propagated wave having a reflecting surface exposed to the liquid in the device and positioned to reflect the wave from the second axis to the first, and to reflect an echo from the first axis to the second, the reflector comprising a transparent element optically exposed to the exterior of the device along the first axis to provide for visual observation of the eye along the first axis.

4. Equipment according to claim 3 in which the hollow device is provide with an eyecup having a lip adapted to contact and seal against the eye socket surrounding the eye being examined and in which the interior of the hollow device is in communication with the eye cup and thereby provide for contact of the liquid in the device with the eye being examined.

5. Equipment according to claim 3 and further including a transparent membrane spanning said opening in the hollow device, the membrane having sufficient flexibility to conform with the curvature of an eye being examined.

6. Equipment according to claim 3 and further including a light source disposed outside of said hollow device but mounted in predetermined relation to the hollow device, and a light reflector disposed outside of the hollow device along the first axis at an angle to reflect light from said source in a direction along the first axis into the eye being examined, the reflector being transparent to provide for visual observation of the eye along the first axis notwithstanding the presence of the reflector.

7. Equipment according to claim 3 and further including a transparent partition element in the hollow device along the first axis at a point spaced from the eye position to shut off an eye chamber from the remainder of the hollow device and in which said eye chamber is open to the eye when the device is in use to thereby bring the liquid therein into contact with the eye being examined.

8. Equipment according to claim 7 and further including separate means for introducing liquid into said chamber and into the remainder of said hollow device.

9. Equipment for use in eye examination comprising a hollow device adapted to contain a transparent liquid and having an opening through which the liquid in the device is adapted to be exposed to an eye along a first axis, and mechanism for setting up an ultrasonic wave along said first axis including means establishing a path for ultrasonic waves along a second axis intersecting the first axis, a reflector at the intersection of said axes positioned to reflect waves from either axis to the other, and an ultrasonic transducer positioned along the second axis to propagate an ultrasonic wave along the second axis to be reflected therefrom to the first axis, the reflector comprising a transparent element optically exposed along the first axis to provide for visual observation of the eye through the reflector along the first axis.

10. Equipment for use in eye examination comprising a hollow device having two bores therein positioned with their axes intersecting, a first one of the bores being adapted to be associated with an eye to be examined and having a transparent structure therein at a point spaced from the eye position to shut off a chamber from the remainder of the bore, which chamber is adapted to receive a liquid for contact with the eye when the equipment is in use, an ultrasonic transmission medium in the remainder of said one bore and in the other bore, and a reflector at the intersection of the axes of the bores in contact with said medium and positioned to reflect ultrasonic waves from the axis of either bore to the axis of the other bore, the reflector being transparent and optically exposed exteriorly of the hollow device to provide for visual examination of the eye along the axis of the first bore.

11. Equipment for use in eye examination comprising a hollow device adapted to contain a transparent liquid and having an opening adapted to be brought into registry with an eye along a first axis, an ultrasonic transducer exposed to the liquid in the device in position to propagate a wave along a second axis at an angle to the first, and an optical prism having a first surface exposed to the liquid in the device and positioned to reflect the propagated wave from the second axis to the first and to reflect an echo from the first axis to the second, and the prism further having a second surface angled with respect to the first surface and optically exposed to the exterior of the device along the first axis to provide for visual observation of the eye along the first axis, said second surface of the prism being positioned to correct the refraction occurring at the interface between the first surface and the liquid in the device.

12. Equipment for use in eye examination comprising a hollow device having a chamber adapted to contain a transparent liquid, a flexible membrane in part defining said chamber, the membrane being positioned along a first axis through said chamber and being adapted to be placed in contact with an eye to be examined, an ultrasonic transducer exposed to the liquid in the device in position to propagate a wave along a second axis at an angle to the first, and a reflector for the propagated wave having a reflecting surface exposed to the liquid in the device and positioned to reflect the wave from the second axis to the first, and to reflect an echo from the first axis to the second, the reflector comprising a transparent element optically exposed to the exterior of the device along the first axis to provide for visual observation of the eye along the first axis.

13. Equipment for use in eye examination comprising a hollow device adapted to contain a transparent liquid and having an opening adapted to be brought into registry with an eye to be examined, and an ultrasonic transducer exposed to the liquid in the device to propagate a wave in the liquid for transmission through the liquid to the eye being examined, the transducer including a wave propagating piezo-electric crystal and a sonically opaque shutter adjacent the wave propagating face of the crystal and having a shutter aperture of substantially smaller size than said face of the crystal.

14. Equipment according to claim 13 and further including an echo receiving piezo-electric crystal positioned at the side of said shutter opposite to the first crystal, the second crystal being of size substantially larger than the shutter aperture and being apertured in registry with the shutter aperture.

References Cited

UNITED STATES PATENTS

| | | | |
|---|---|---|---|
| 2,763,153 | 9/1956 | Simjian | 73—67.8 |
| 2,784,325 | 3/1957 | Halliday et al. | 310—8.1 |
| 2,830,578 | 4/1958 | De Groff | 128—24.5 |
| 3,024,644 | 3/1962 | Fry et al. | 76—67.5 |
| 3,068,370 | 12/1962 | McInnish | 310—8.7 |
| 3,233,450 | 2/1966 | Fry | 73—67.8 |
| 3,237,623 | 3/1966 | Gordon | 128—24 |
| 3,256,733 | 6/1966 | Carlin | 73—67.8 |
| 3,294,988 | 12/1966 | Packara | 310—8 |
| 3,309,655 | 3/1967 | Von Ardenne | 340—15 |
| 3,323,354 | 6/1967 | Daubresse et al. | 73—67.8 |

OTHER REFERENCES

Baum & Greenwood, "Ultrasonics," pp. 319–329, Am. J. Ophth., November 1958.

Mundt & Hughes, "Ultrasonics," pp. 488–493, Am. J Ophth., March 1956.

RICHARD A. GAUDET, *Primary Examiner*.

SIMON BRODER, *Examiner*.